United States Patent Office 3,532,371
Patented Oct. 6, 1970

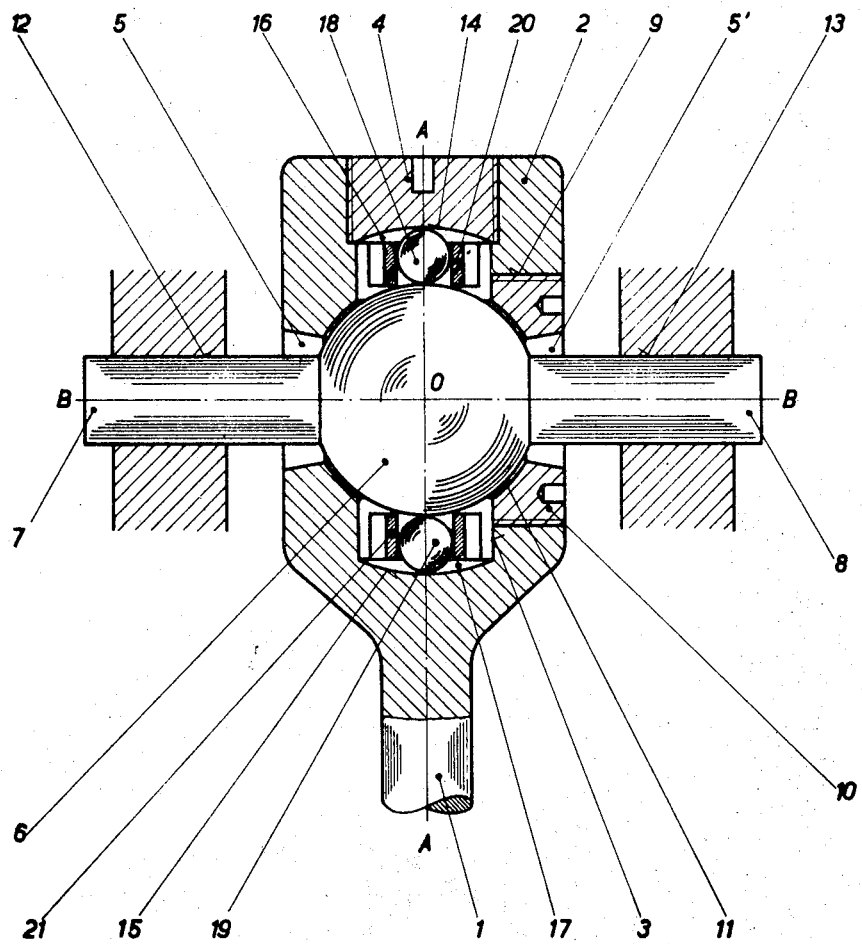

1

3,532,371
ANTIFRICTION BALL JOINT
Johannes Ortheil, Anrath, Germany, assignor to Langen
& Co., Dusseldorf, Germany
Filed Mar. 12, 1969, Ser. No. 806,526
Claims priority, application Germany, Mar. 25, 1968,
1,750,050
Int. Cl. F16c 11/06
U.S. Cl. 287—88                                  3 Claims

ABSTRACT OF THE DISCLOSURE

An antifriction ball joint for the transmission of forces in tension and compression and more particularly for vehicle shock absorbers in which the head of a link of the ball joint, there are positioned balls which roll off or glide on a ball body or race located within the head symmetrical to the axis of the link and to which are attached at both sides thereof trunnions or shafts having an axis which intersects the axis of the link and enters a cross bore or aperture in the head with the diameter of the cross aperture being greater than the diameter of the trunnions so as to make possible lateral angular movements.

BACKGROUND OF THE INVENTION

When ball joints of the type under consideration are mounted, for example, between a vehicle longitudinal steering assemblage and a hydro-pneumatic shock absorber for cushioning the movements of the steering assemblage relative to the chassis, there results a main plane of movement with a pivot angle of, for example, 25° and a pivot angle of 5° transverse thereto. It is manifest from these figures that a relatively small portion of a full circular movement is executed. It is thereby that compressive forces are transmitted preferably but tensional forces may also develop when the cushioning movements alternate strongly. In order to prevent premature wear, as little play as possible must be additionally assured between the various components constituting the joints.

SUMMARY OF THE INVENTION

It is the object of the present invention to provide a ball joint of the type described which, in addition to employing as little an assembly space as possible, also permits a clearance adjustment.

According to the invention, the problem is solved in that the race is spherical and is of slightly lesser diameter than the hollow space surrounding the race, with a blind aperture extending coaxial to the axis of the link being provided in the head, with the bottom of the blind aperture together with the bottom of an adjustable plug or cap closing the blind aperture being curved concentric to the race in order that the chambers axially limited by the bottoms and the race receive, without play, a ball each.

In a preferred embodiment of the invention, the diameter of the blind aperture is greater than that of the balls with the balls being centered in the blind aperture by a radially deformable cage. To enable a better assembly, the race may be guided on one side in the direction of the axis of the trunnion by an adjustable cover which is provided with a correspondingly shaped inside and equipped with an aperture for mounting on the trunnion.

BRIEF DESCRIPTION OF THE DRAWINGS

The sole figure is a fragmentary view partly in cross-section and partly in elevation of a ball joint embodying the present invention.

DETAILED DESCRIPTION OF THE INVENTION

As illustrated in the drawing, a link 1 is provided at its end with a head portion 2. The head portion 2 is formed with, coaxial to center line A—A of the link 1, a blind aperture 3. The aperture 3 is adapted to be closed by a plug or cap 4 which is adjustable. The head portion 2, perpendicular to the center line A—A, is formed with a through bore or aperture 5 and center line B—B thereof intersects the center line A—A at point O. A spherical hollow space having its center at point O within the interior of the head portion 2 is adapted to receive a race or a ball body 6 to which diametrically opposed trunnions or shafts 7 and 8 respectively are attached. On the side of the trunnion 8, the race 6 is guided by a cover 10 which is threaded into an aperture 9 in the head portion 2 and the inside of the cover is formed with a corresponding spherically shaped surface 11. The cover 10 is also formed with an aperture 5' which is a counterpart to the through bore 5. The through bore 5 and aperture 5' are entered by te trunnions 7 and 8 which are mounted in suitable bearings 12 and 13 respectively. It will be noted that the through bore 5 and the aperture 5' are of a greater diameter than the diameter of the trunnions 7 and 8 in order that the head portion 2 and the trunnions 7 and 8 can turn relative to one another in the planes defined by the center lines A—A and B—B.

The plug or cap 4 is provided with an inner surface 14 and the inner surface 14 together with bottom 15 of the blind aperture 3 are of spherical configuration so that the center of the respective ball coincides with the point O. Inserted within chambers or spaces 16 and 17 constituted axially by the inner surface 14, the bottom 15 and the race 6 are balls 18 and 19 respectively. The balls have no clearance axially and are retained by radially elastically deformable cages 20 and 21 respectively.

By virtue of the above described assemblage, it is possible, up to a certain pivot angle of the link 1, for the balls 18 and 19 to roll off the race 6 or the inner surface 14 and the bottom 15. The cages 18 and 19 are thus deformed elastically thereby placing the same into the position to center the balls in the event a slackness should develop. It should be pointed out that the slackness can be adjusted or eliminated by turning or adjusting the plug or cap 4.

This invention is not to be confined to any strict conformity to the showings in the drawings but changes or modifications may be made therein so long as such changes or modifications mark no material departure from the spirit and scope of the appended claims.

I claim:
1. An antifriction ball joint for the transmission of tension and compression forces and more particularly for vehicle shock absorbers, including a link having a head portion, said head portion having blind aperture therein extending coaxially to the center line of the link, a spherical ball located within the head portion symmetrically with respect to the center line of the link, trunnions attached to opposite sides of the ball having a center line which intersects the center line of the link and said trunnions entering a cross bore in the head portion, the diameter of the cross bore being greater than the diameter of the trunnions to permit lateral angular movements, an adjustable closure for the blind aperture, the inner surface of the adjustable closure and the bottom of the blind aperture being curved concentric to the ball spherical surface and providing a pair of chambers axially defined by said inner surface and the all spherical surface and the bottom of the blind aperture, and a ball received with clearance in each chamber.

2. The antifriction ball joint as claimed in claim 1 in which the diameter of the blind aperture is greater than the diameter of the balls, and radially deformable cages centering the balls in the blind aperture.

3. The antifriction ball joint as claimed in claim 1 in which the ball is guided on one side in the direction of the trunnion center line by an adjustable cover having a correspondingly shaped inner surface and an aperture for receiving the trunnion.

References Cited

UNITED STATES PATENTS 2,401,838 6/1946 Mitchell.
3,401,964 9/1968 Johnson _____ 287—88

DAVID J. WILLIAMOWSKY, Primary Examiner

A. V. KUNDRAT, Assistant Examiner

U.S. Cl. X.R.

308—72